United States Patent [19]
Bushmann et al.

[11] Patent Number: 6,088,641
[45] Date of Patent: Jul. 11, 2000

[54] METHOD AND DEVICE FOR CONTROLLING A MOVABLE OBJECT

[75] Inventors: Robert Bushmann, Ober Ramstadt 2; Michael Kessler, Offenback; Gerhard Lindner, Coburg; Christian Brütting, Marktredwitz; Jürgen Eichinger, Augsburg, all of Germany

[73] Assignee: Brose Fahrzeugteile GmbH & Co. KG, Coburg, Germany

[21] Appl. No.: 09/043,050
[22] PCT Filed: Apr. 29, 1996
[86] PCT No.: PCT/DE96/00809
§ 371 Date: Aug. 19, 1998
§ 102(e) Date: Aug. 19, 1998
[87] PCT Pub. No.: WO97/10468
PCT Pub. Date: Mar. 20, 1997

[30] Foreign Application Priority Data

Sep. 13, 1995 [DE] Germany .................. 195 33 872

[51] Int. Cl.⁷ .................. B60R 22/00; E05F 15/00
[52] U.S. Cl. .................. 701/49; 701/45; 701/48; 318/286
[58] Field of Search .................. 701/45, 46, 47, 701/49, 48; 318/286, 460; 455/73, 74, 78

[56] References Cited

U.S. PATENT DOCUMENTS

| | | | |
|---|---|---|---|
| 3,850,503 | 11/1974 | Riseberg et al. | 385/41 |
| 3,909,741 | 9/1975 | Harris | 330/5.5 |
| 5,345,045 | 9/1994 | Rohwedder | 181/176 |
| 5,410,227 | 4/1995 | Toyozumi et al. | 318/283 |
| 5,432,392 | 7/1995 | Kadota et al. | 310/313 A |

FOREIGN PATENT DOCUMENTS

| | | |
|---|---|---|
| 0560047 | 9/1993 | European Pat. Off. . |
| 4215744 | 11/1993 | Germany . |

*Primary Examiner*—William A. Cuchlinski, Jr.
*Assistant Examiner*—Gertrude Arthur
*Attorney, Agent, or Firm*—Christie, Parker & Hale, LLP

[57] ABSTRACT

A method and device for controlling a displaceable object operated by a motorized drive unit, for example a window pane, sliding roof or the like in a motor vehicle, and is particularly suitable for use as an anti-collision protector. By using surface waves in the area being monitored, it allows a simplified attachment of transmitter and receiver on the displaceable object. At least one mode converter is mounted in active connection with the area being monitored or with an area connected to this area wherein the mode converter (a) converts a volume wave running into the monitoring area (5,5') into a surface wave and/or (b) converts a surface wave running into the receiver into a volume wave. The mode converter is preferably constructed from several periodically arranged elements which are mounted along the propagation direction of the surface wave and have a division t which corresponds approximately to the wave length $\lambda$ of the surface wave.

85 Claims, 10 Drawing Sheets

METHOD AND DEVICE FOR CONTROLLING A MOVABLE OBJECT

BACKGROUND

The invention relates to a method and device for controlling a displaceable object operated by a motorized drive unit, for example a window pane, a sliding roof or the like in a motor vehicle. It is especially suitable for use as a collision protector, for example, to prevent objects from becoming trapped between the vehicle frame and the window pane as it is being closed. It also allows simplified attachment of a transmitter and receiver on the displaceable object.

From DE 42 15 744 A1 a device is known for controlling remote-controlled parts, such as, for example, a window pane in a vehicle, which produce acoustic surface waves (so-called Rayleigh waves) by means of an electrical-mechanical converter (actuator), designed as a sensor, on an edge of the displaceable part, such as, for example, a window pane. This edge is in wave-conducting connection with the edge of the area being monitored, for example the closing area of the window pane. A receiver on the other side of the area being monitored measures the energy of the incoming surface waves and sends the measured signals to an electronic evaluator unit.

It is also proposed to use only a one-piece transmitter/receiver unit, or wedge converter, wherein at an opposite end of the area being monitored there is a reflector, for example a notch in the pane edge, which is suitable to reflect a sufficiently large part of the emitted surface wave energy so that a measured signal is generated in the transmitter/receiver unit which is capable of being evaluated. As a result of a signal damping detected from the area being monitored and measurable on the receiver through dissipation of the surface wave energy on contact with area being monitored, conclusions are drawn regarding a possible case of collision, and the direction of movement of the displaceable part is reversed, where applicable, in the "opening" direction.

The wedge converters required for surface wave generation and receiving described in the above-mentioned reference have however the disadvantage that their attachment on the edge of the displaceable object is not quite straightforward since the propagation direction characteristics of the surface waves have to be observed absolutely. Thus, a wedge converter can only produce surface waves in one propagation direction or receive them from one propagation direction. There is also the drawback that the use of the inventive principle on the basis of wedge converters for reasons of space requires that they are fixed solely outside of the visible area of the edge (of the displaceable object). When monitoring side window panes, this means that the wedge converters are attached to the lower edge of the window pane. The area of the edge of the displaceable object on which the converters are fixed can be locally separated from the monitoring area by a seal which likewise has a damping effect. The damping effect of the seal can however under certain circumstances lead to faulty interpretations of the measured results.

As an alternative to wedge converters it is possible to use shear vibrators or interdigital converters. These can be fixed directly on the edge of the area to be monitored. The manufacture of such converters is however substantially more expensive than manufacturing thickness vibrators.

SUMMARY

According to an embodiment of the present invention, a method and device for controlling a displaceable object operated by a motorized drive unit, for example a window pane, is provided which provides reliable signal evaluation using simple thickness vibrators.

According to one embodiment of the invention, a device is provided for controlling a displaceable object, having an area to be monitored with two ends, operated by a motorized drive unit, for example a window pane or sliding roof in a motor vehicle or the like. The device includes: a transmitter in the form of an electrical-mechanical converter adapted to trigger vibrations in the material of the displaceable object wherein said vibrations form the basis of a surface wave which is propagated along a surface of the area to be monitored; a receiver in the form of a mechanical-electrical converter adapted to receive acoustic vibrations and convert them into electrical signals; an electronic control and evaluator unit adapted to control the transmitter, the receiver, and the motorized drive unit on the basis of the electrical signals from the receiver; and at least one mode converter operatively connected to the area to be monitored, wherein the mode converter is capable of (a) converting a first volume wave formed by the vibrations generated by the transmitter and entering the area to be monitored into the surface wave and/or (b)converting the surface wave from the surface of the area to be monitored and entering the receiver into a second volume wave.

According to an embodiment, a mode converter is located in active connection with the area to be monitored on the displaceable object or with an area connected thereto to conduct acoustic surface waves wherein the mode converter converts a volume wave traveling through the displaceable object and towards the area to be monitored into a surface wave and/or converts a surface wave running back to the receiver into a volume wave. By "volume waves" are meant sound waves which have both longitudinal components and transversel components wherein one portion normally predominates. Since solid bodies transfer shear tensions, transverse waves always occur in solid bodies as well as the longitudinal waves. Periodically mounted geometric structures whose division corresponds to the wave length $\lambda$ of the surface wave to be produced can be used as a mode converter. Such geometric structures can be, for example, rows of holes near the area to be monitored, thus the circumferential edge of a window pane for example, or wedge-shaped recesses in the window pane edge.

According to another embodiment separate, i.e., additional elements, are attached on the area to be monitored or the area in wave-conducting connection therewith in order to cause a mode conversion of a volume wave into a surface wave or vice versa. For example, it is possible to use structures adhered, printed, sintered or vapor deposited on the pane edge periodically with a division of about the wave length $\lambda$ of the surface wave, wherein these structures, owing to their very low height are scarcely visible and also do not protrude obstructively in the side guide area of the window pane.

The surface wave length of the converter material does not correspond exactly to the surface wave length of the free glass edge owing to the differing boundary face conditions between the glass/air on one side and glass/converter on the other.

A further embodiment of a "separate" mode converter provides a connection of a flat wedge with the circumferential edge of the window pane wherein slit-like recesses are formed with a suitable inclined angle in the common contact face of the wedge so that after refraction of the volume waves coming from the pane body towards the wedge and reflection at the recesses of the wedge substantially parallel to the pane edges, the volume waves on reentering the pane edge are converted into surface waves.

The mode conversion at the mode converter is, when necessary, possible in both directions, i.e., a volume wave (more particularly a longitudinal wave) spreading out through the glass body of the window pane is, on striking the mode converter mounted near the window pane edge or in the window pane edge itself, converted into a surface wave (more particularly a Rayleigh wave). If a surface wave passes into the active area of one of the above-mentioned mode converters, then this is converted, among other things, into a volume wave. Owing to the damping properties of the relevant vibration-conducting bodies and owing to the losses of energy due to conversion, the fewest possible mode converters should lie within a path of the acoustic waves between transmitter and receiver.

According to another embodiment, a one-piece transmitter/receiver unit is provided for generating and receiving volume waves by means of a simple thickness vibrator. According to this embodiment, the use of only one mode converter is advantageous. It converts the volume wave running towards the area to be monitored into a surface wave and the surface wave running back from the reflector into a volume wave which can be detected by the receiver. Slit-like notches with approximately vertical flanks relative to the path of the area to be monitored are particularly suitable as reflectors, but other irregular spots with sufficiently good acoustic reflection behavior are also suitable.

According to another embodiment, the transmitter and receiver (for generating and receiving volume waves respectively) are spaced widely apart from each other. In this case the use of two mode converters flanking the monitoring area at the ends is generally required.

According to another embodiment, the transmitter and receiver for different modes of acoustic waves are combined, thus providing a transmitter for volume waves and a receiver for surface waves or vice versa. One mode converter is provided accordingly between the monitoring area and receiver and between the transmitter and monitoring area, respectively.

The invention can be used with particular advantage as a so-called anti-jamming protector for window panes in motor vehicles. An area to be monitored is hereby defined as including all those edges of the window pane which form a gap with the bodywork when the window is opened. With front windows, monitoring the upper curved pane edge is generally sufficient. The window panes in the back often have a trapezoidal contour so that during opening, one of the substantially vertically moving edges opens an area which could provide a jamming risk. Therefore this edge must also be monitored.

The areas of the circumferential pane edge not to be monitored can be used to attach the transmitter and receiver. The transmitter or receiver facing a mode converter should thereby have a position relative to the mode converter such that the mode converter with respect to the transmitter and the receiver with respect to the mode converter lie in the main propagation direction of the acoustic wave.

When constructing mode converters and reflectors in the outer contour of the window pane, or directly adjoining the window pane edge, steps can also be taken to ensure that they cannot be touched or impair the visual appearance. This can be achieved for example by filling out the notches, slits or holes with a material whose acoustic properties differ substantially from those of the basic material (e.g., of the glass body of the window pane).

The corners of the pane edges which stand at angles to each other are designed with a sufficiently large angle so that they do not trigger any undesired mode conversion.

Although the description of the invention above deals only with a use for adjustable window panes of a motor vehicle, the general character of the inventive idea allows it to also be used outside of vehicle technology. Thus, for example, it can be used to control a rotatable plate in dependence on the contact point on another body of its outer circumferential edge. The plate is divided into sectors by notches that act as reflectors that reflect volume waves, and, the notches are partially permeable to the surface waves. A transmitter/receiver unit can be recessed axially which would be allocated a mode converter on the outer circumferential edge.

Further combinations of transmitter, receiver, mode converters and, where applicable, reflectors can be freely selected taking into account the means-action relationships according to the invention and the specific requirements for each use.

BRIEF DESCRIPTION OF THE DRAWINGS

The foregoing features and advantages of the invention will be better understood by referring to the following drawings:

FIG. 6 is a diagrammatic illustration of the wave propagation and mode conversion in the material of a window pane of a motor vehicle according to the embodiment shown in FIG. 5 wherein FIG. 6a shows the path of the wave emerging from the transmitter up to the reflector and FIG. 6b shows the path of the reflected wave to the receiver;

FIG. 9 is similar to FIG. 6, but with two reflectors defining the area being monitored and a mode converter formed by a row of holes and set in between the reflectors, wherein FIG. 9a shows the path of the wave emerging from the transmitter up to the reflectors and FIG. 9b shows the path of the reflected wave up to the receiver;

FIG. 11b is a block diagram of the propagation and conversion of a mechanical wave between transmitter and receiver according to the diagrammatic illustration of FIG. 11a;

FIG. 18b is a plan view of the interdigital converter of 18a;

DETAILED DESCRIPTION

Figure 1:
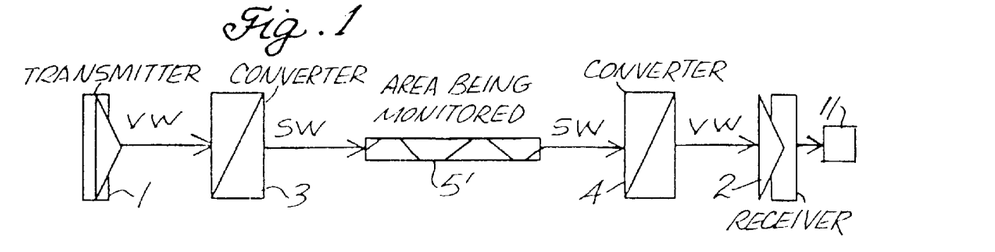
FIG. 1 is a block circuit diagram of the propagation and conversion of a mechanical wave between a transmitter and a receiver using a mode converter on each of the edges of the area being monitored according to one embodiment of the invention.

The block diagram of FIG. 1 illustrates one embodiment of the invention that uses a transmitter 1 to generate volume waves (VW) which are propagated in a body conducting acoustic waves, for example in the glass body of a window pane, until reaching a mode converter 3. By "volume waves" are meant sound waves which have both longitudinal components and transversel components wherein one portion normally predominates. Since solid bodies transfer shear tensions transversel waves also always occur in same as well as the longitudinal waves. This mode converter, which is in active connection with an area 5' being monitored, converts most of the energy of the volume waves into surface waves (SW), or rather acoustic waves traveling on the surface of the body. Since the surface waves are propagated in the boundary layer of the relevant body, energy can be dissipated by contact with this boundary layer, leading to a measurable signal damping. At the end of the area 5' being monitored there is a second mode converter 4 for converting back the incoming surface waves into volume waves which are propagated in the direction of a separate receiver 2. By evaluating the transmission and receiving signals, it is possible to conclude whether or not a body has come into contact with the area 5' being monitored. An evaluator logic device 11 ensures a corresponding reaction, for example, reversing the setting movement of a drive.

Figure 2:
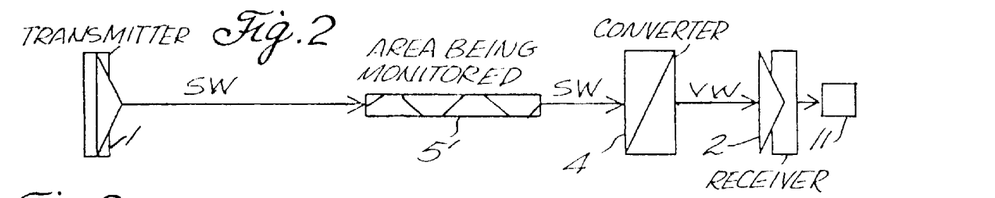
FIG. 2 is a block diagram of the propagation and conversion of a mechanical wave between a transmitter and a receiver by using a mode converter between the area being monitored and the receiver according to another embodiment.

FIG. 2 shows a block diagram of an embodiment with only one mode converter 4 between the area 5' being monitored and the receiver 2 for converting surface waves into volume waves. The transmitter 1 produces the surface waves directly at an end of the area 5' being monitored or on a boundary face which is in wave-conducting connection with the area 5' being monitored. A transmitter 1 and receiver 2 are again designed as separate components and are mounted on the edges of the area 5' being monitored.

Figure 3:
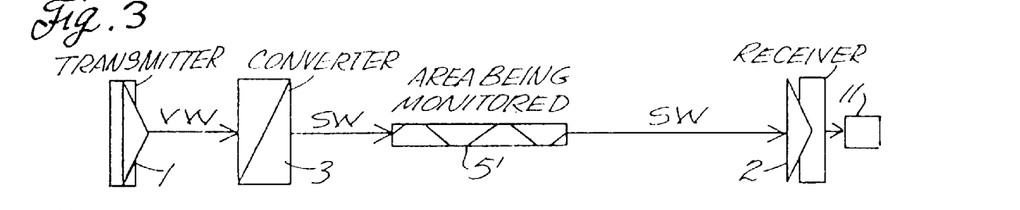
FIG. 3 is a block diagram of the propagation and conversion of a mechanical wave between a transmitter and a receiver by using a mode converter between the transmitter and area being monitored according to another embodiment.
Figure 4:
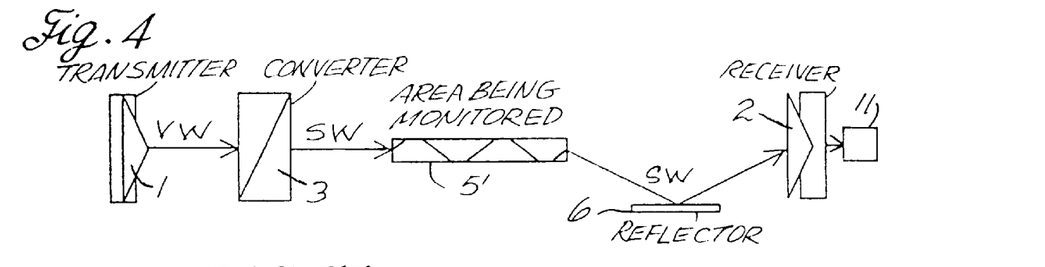
FIG. 4 as FIG. 3, but additionally with a reflector in the path of the wave propagation between an area being monitored and a receiver according to another embodiment.

FIGS. 3 and 4 illustrate embodiment that also use transmitters 1 producing volume waves and a mode converter 3 for converting volume waves into surface waves in active connection with the area 5' being monitored. Receivers 2' are mechanical-electrical converters which can sense surface waves and which are mounted at the end of the area 5' being monitored or on a boundary face in wave-conducting connection with this area 5'. According to FIG. 4, a reflector 6 is provided additionally in the propagation path of the surface wave, this reflector being for example in the form of a notch or slit in the edge of a window pane.

Figure 5:
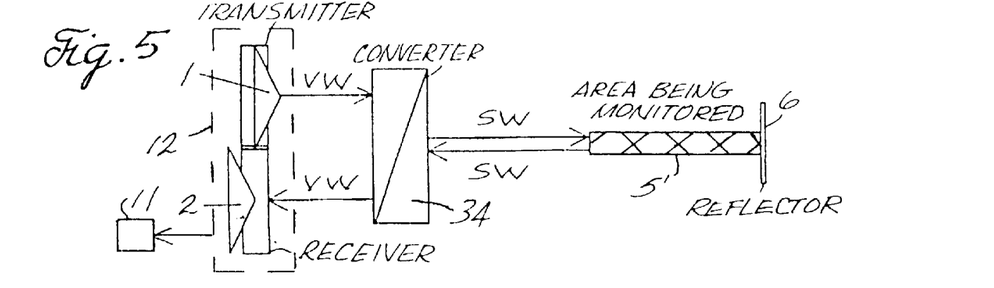
FIG. 5 is a block circuit diagram of the propagation and conversion of a mechanical wave between a transmitter and a receiver with a one-piece transmitter/receiver unit and a mode converter running in both directions from the wave according to another embodiment.

The embodiment of the invention illustrated in FIG. 5 uses a one-piece transmitter/receiver unit 12 consisting of a transmitter 1 and receiver 2. If the transmitting and receiving modes are staggered in time then a single thickness vibrator can be used for both the transmitter 1 and receiver 2. It could alternately produce and receive volume waves. This transmitter/receiver unit 12 is allotted a common mode converter 34 which works in two propagation directions. First the mode converter 34 converts the volume waves produced in the transmitting mode into a surface wave which is propagated along the area 5' being monitored until reaching a reflector 6. After its reflection and return along the area 5', the reflected surface wave is converted back into a volume wave which is sensed on reaching a receiver 2 (or the one-piece converter during the receiving mode).

FIGS. 6 to 11 show various technical embodiments which are adapted to the needs of an anti-jamming protector for remote-controlled window panes in motor vehicles. In principle these embodiments can also be used to control other displaceable objects. The invention can also be used in connection with other materials that conduct acoustic waves, for example steel.

Figure 6A:
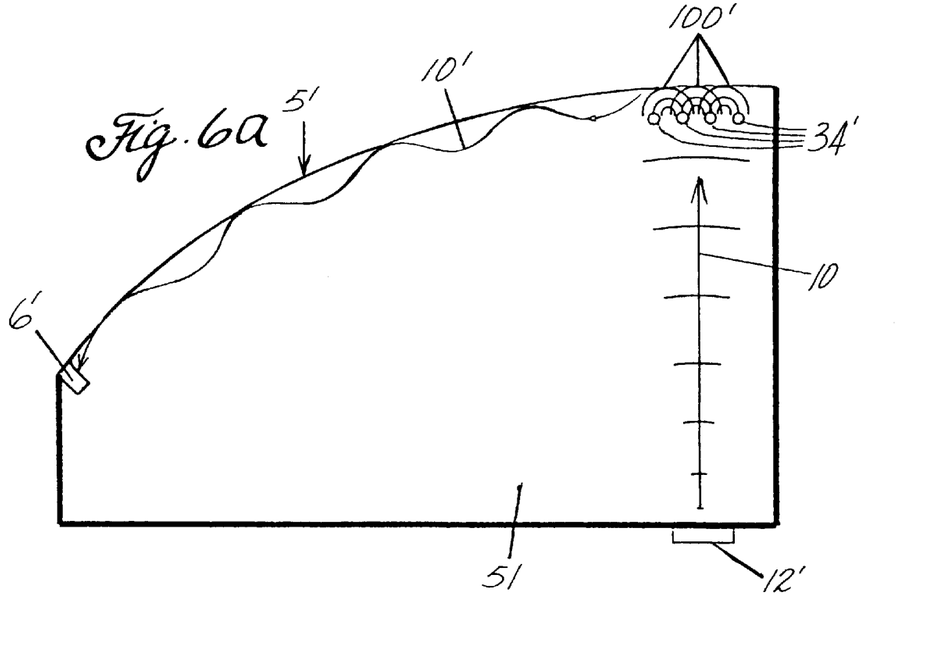

FIG. 6a diagrammatically illustrates the wave propagation and mode conversion in the material of a window pane 51 of a motor vehicle. The volume wave emitted by the transmitter/receiver unit 12' with a propagation direction 10 reaches near the upper edge of the pane (area 5' to be monitored) where the mode converter 34', consisting of a row of holes, is positioned. When the volume wave passes through the grid-like mode converter 34', an elementary wave 100' arises at each gap whose interference on the upper edge 5' of the pane finally leads to the formation of surface waves. From the mode converter 34' mounted at one end of the area 5' being monitored, the surface wave is propagated along its path 10 up to a reflector which is designed as a notch 6'.

Figure 6B:
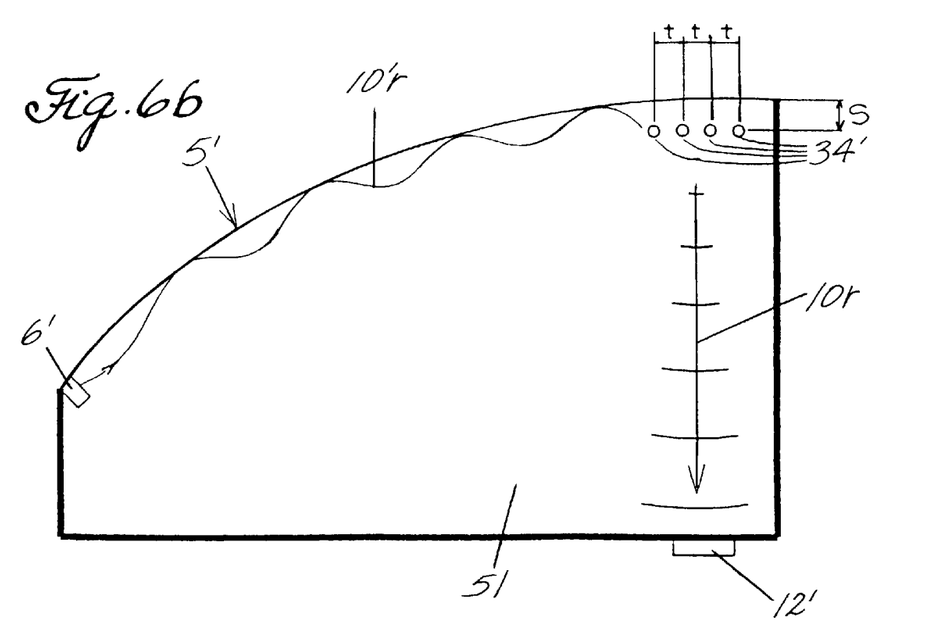

FIG. 6*b* shows the path 10'*r* of the returning surface wave which on reaching the mode converter 34' is converted into a volume wave and runs with the propagation direction 10*r* onto the transmitter/receiver unit 12'. If the transmitter/ receiver unit 12' is in the receiving mode, the energy of the incoming volume wave can be sensed and the degree of acoustic damping can be entered in a micro-controller and compared with the transmission energy. On exceeding a boundary value which has been previously stored or has been determined based on the conditions of the displacement system, the evaluator logic device 11 interrupts the upward movement of the window pane, and where applicable, causes a reverse movement of the window pane 51. It is thereby ensured that any object or part of the body which may have been jammed is released.

In order to achieve a high degree of efficiency of the mode converter 34' it should be noted that a division t of the individual holes of the row of holes, that is, their spacing from each other, corresponds as exactly as possible to the wave length λ of the surface waves to be produced in the glass. A distance s of the mode converter 34' from the area 5' being monitored should be determined experimentally. It is then ideal if the interference of the elementary waves 100' leads to a maximum formation of surface waves.

Figure 7:
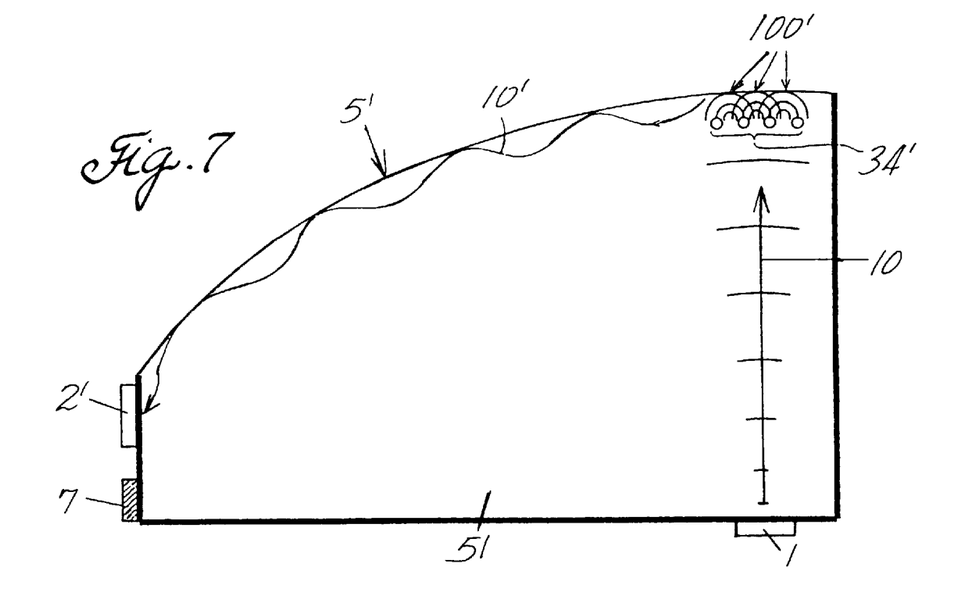
FIG. 7 is a diagrammatic illustration of the wave propagation and mode conversion in the material of a window pane of a motor vehicle according to the embodiment shown in FIG. 3, wherein the transmitter produces volume waves and the receiver is set to receive surface waves.

Whereas the embodiment of FIGS. 6*a* and 6*b* corresponds to the block diagram of FIG. 5, the variation of FIG. 7 operates along the principle illustrated in the block diagram of FIG. 3. Accordingly the transmitter 1 and receiver 2' (FIG. 7) are spatially separated from each other. The transmitter 1 is (like FIG. 6) again mounted on the lower pane edge opposite the mode converter 34' and is preferably designed as a single thickness vibrator. The volume wave emerging from the mode converter 34' is, on passing through the mode converter, converted into a surface wave which is sensed on reaching the receiver 2' placed at the other end of the area 5' being monitored.

By arranging the receiver 2' on the side vertically aligned pane edge it lies within the guide profile of the window frame (not shown) and thus remains invisible. If the receiver 2' is enclosed by a sufficiently stable housing then this and a further guide element 7 mounted on the side pane edge can act as guides inside the associated part of the window frame.

Figure 8:
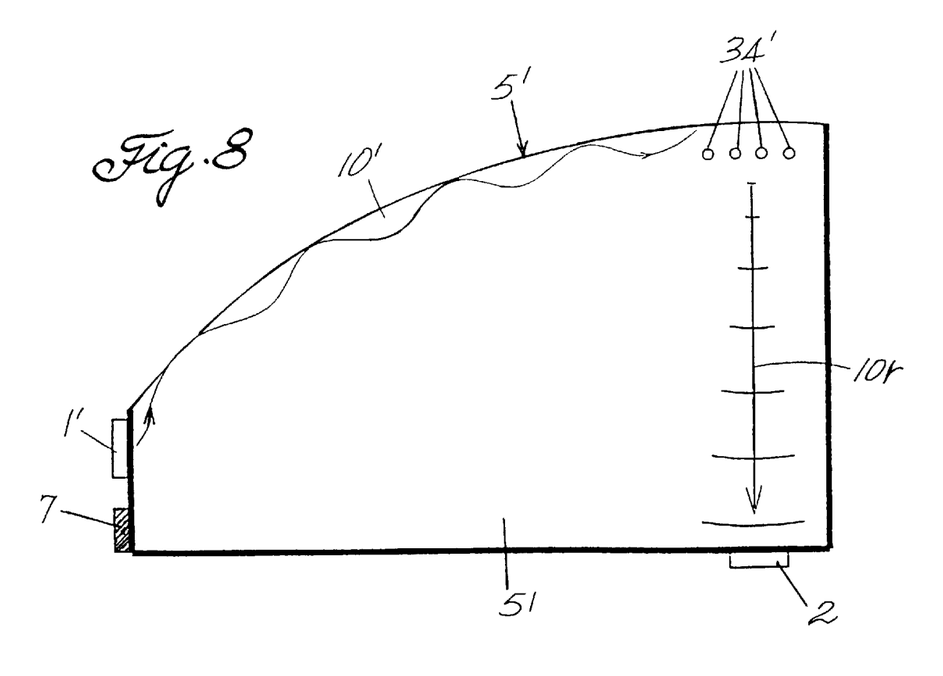
FIG. 8 is a diagrammatic illustration of the wave expansion and mode conversion in the material of a window pane of a motor vehicle according to the embodiment shown in FIG. 2 wherein the transmitter produces surface waves and the receiver is set to receive volume waves.

FIG. 8 shows a variation of the invention which works like the block circuit diagram of FIG. 2 and only differs from the variation according to FIG. 7 in that a transmitter 1' for surface waves is provided on the side vertically aligned pane edge and a receiver for volume waves is provided on the lower pane edge. The mode converter 34' is thus passed by an acoustic wave from the opposite direction (compared with FIG. 7); the surface wave is thereby converted into a volume wave.

Figure 9A:
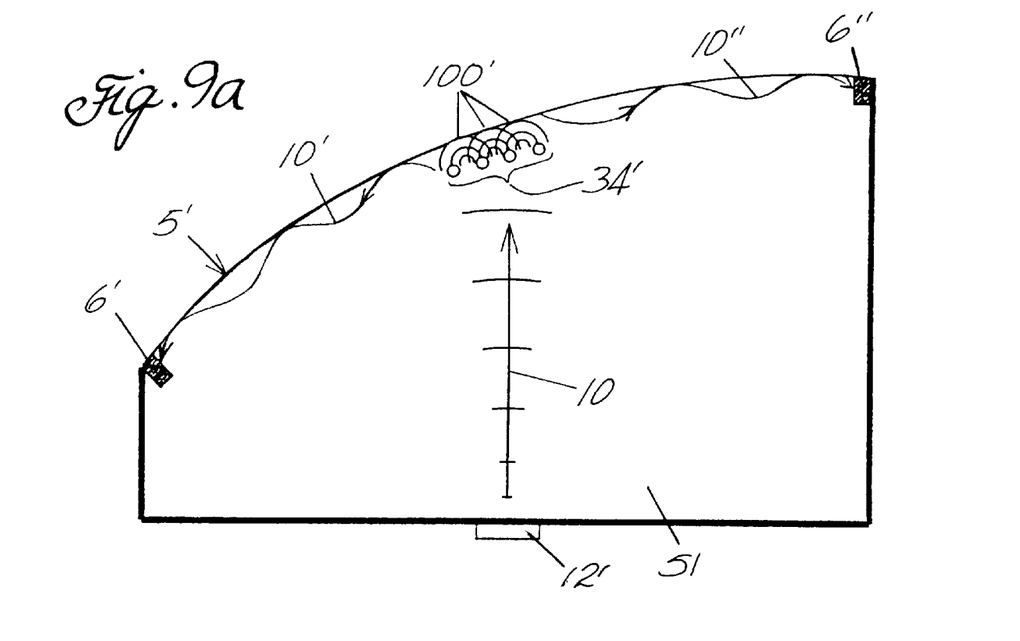
Figure 9B:
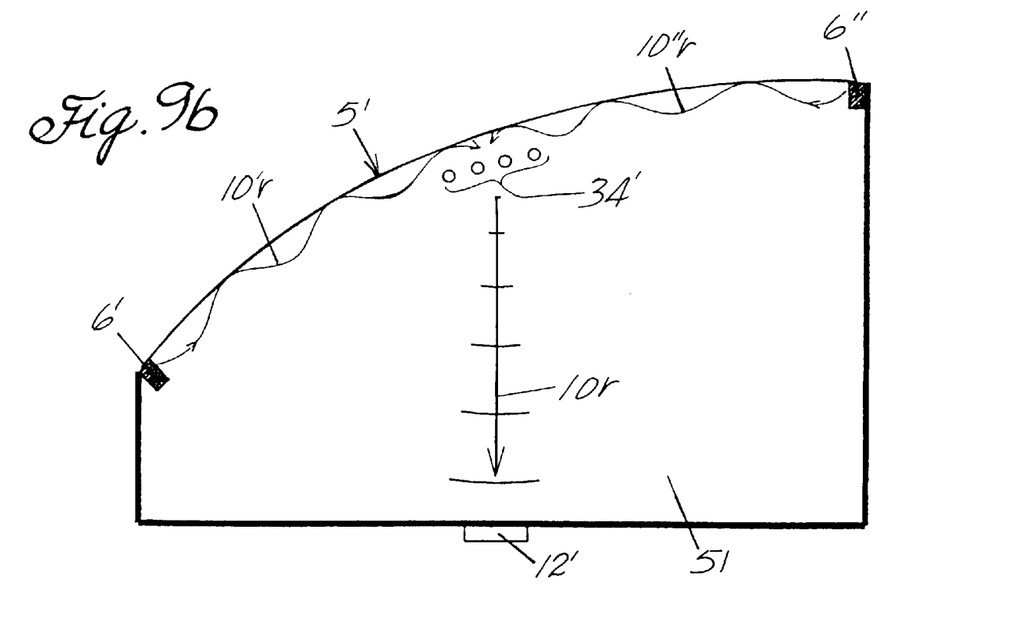

With the embodiment of FIGS. 9*a* and 9*b* the mode converter 34' divides the area 5' being monitored into a left-hand section and a right-hand section wherein the outer edges adjoining the vertical pane edges are each flanked by a notch 6', 6" which function as reflectors for the surface waves emerging from the mode converter 34'. The transmitter/receiver unit 12' placed on the lower edge of the pane beneath the mode converter 34' operates cyclically in the transmitting/receiving mode wherein volume waves are produced and received respectively. Elsewhere that which has been described in connection with FIGS. 6*a* and 6*b* applies to FIGS. 9*a* and 9*b*.

Figure 10A:
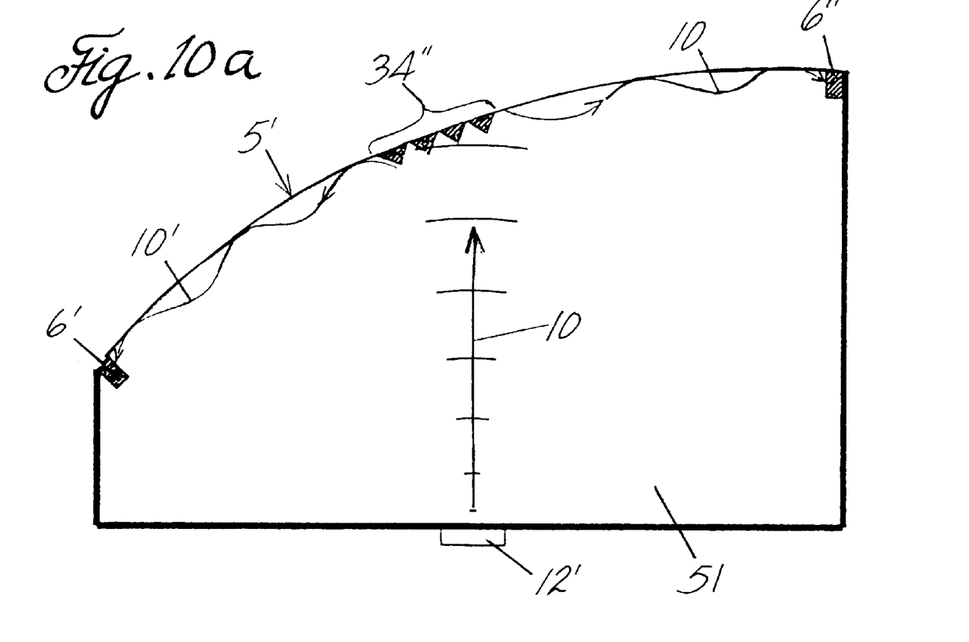
FIG. 10a is similar to FIG. 9a but with a mode converter formed by a row of wedges.
Figure 10B:
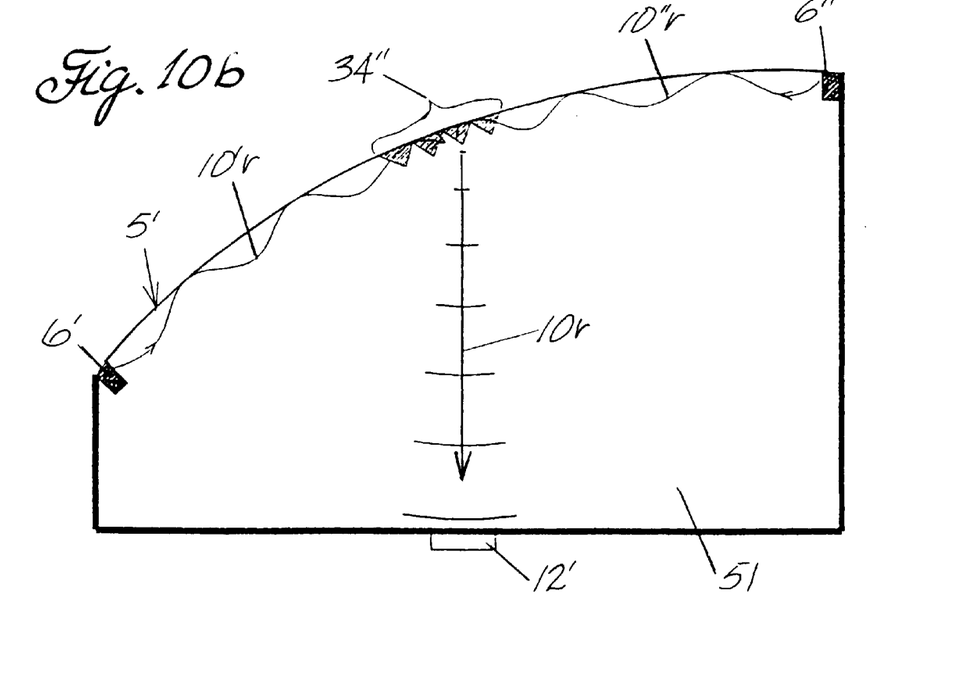
FIG. 10b is similar to FIG. 9b, but with a mode converter formed by a row of wedges.

The variation of the invention shown in FIGS. 10*a* and 10*b* differs from the variation according to FIGS. 9*a* and 9*b* solely through the type of mode converter 34" which was formed directly into the contour of the area 5' being monitored, namely in the form of a row of wedge-type indentations. The division of the individual indentations corresponds, as also with the row of holes 34', to the wave length λ of the surface wave to be produced. The depth of such indentation, with a symmetrical notch form, should amount to d=λ/2. With a symmetrical design of the periodic notches the mode converter 34" can be used equally for generating or receiving surface waves for the purpose of mode conversion. With an asymmetrical design of the notches, for example where one of the wedge flanks forms a smaller angle with the upper pane edge than the other wedge flank, the generation of the surface wave is preferably carried out in the direction of the smaller angle. Receiving the surface wave is preferred from the opposite direction.

In order to protect the mode converter 34" from dirt, these notches should be filled with a material whose acoustic properties differ substantially from those of the window pane. This step can also be taken to protect the slit-like reflectors 6', 6" or to ensure visual unobtrusiveness.

Figure 11A:
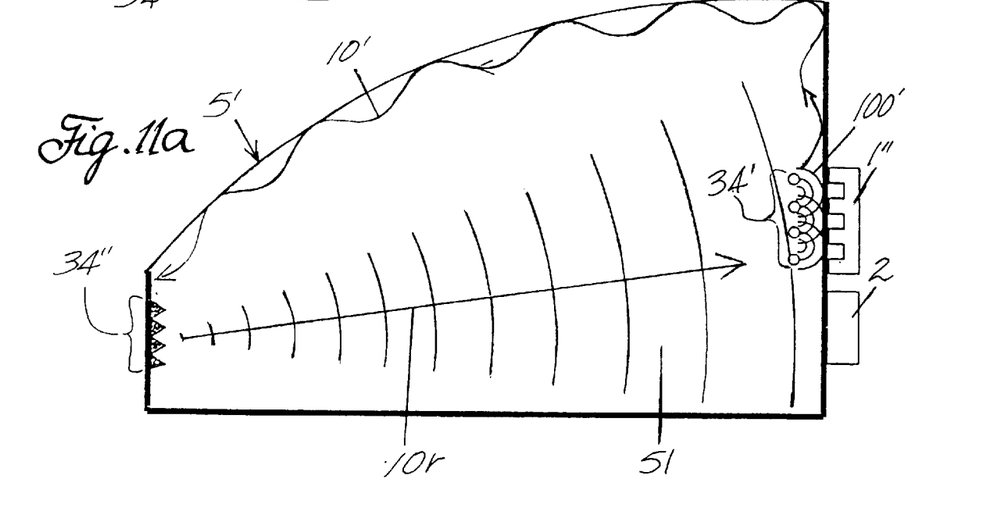
FIG. 11a is a diagrammatic illustration of the wave propagation and mode conversion in the material of a window pane of a motor vehicle according to the embodiment shown in FIG. 5 with two mode converters of different construction on the edges of the area being monitored.
Figure 11B:
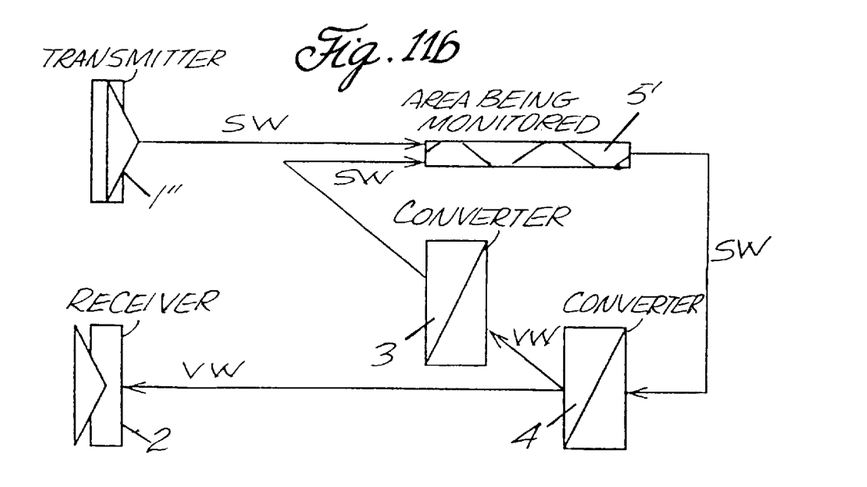

The embodiment of FIG. 11*a* is to show the variety of possible designs of the inventive principle. It combines different mode converters 34' and 34", various types of transmitters 1" and receivers 2 and additionally uses a part of the volume wave returning to the receiver 2 for renewed generation of surface waves which interfere with those produced by the transmitter 1". The block circuit diagram of FIG. 11*b* clearly shows the state of the wave modes between transmitter 1" and receiver 2 of part of the energy which is guided "in circuit".

The transmitter 1" and receiver 2 are fixed on the right hand pane edge wherein the transmitter 1" is designed as a so-called comb converter and is mounted above the receiver 2, that is between the area 5' being monitored and the receiver 2. Directly opposite the transmitter 1" is the mode converter 34' which consists of a row of holes which is in a position to directly produce surface waves and which will be explained in further detail in connection with FIG. 17. Opposite the receiver 2, which is suitable for receiving volume waves, a mode converter 34" consisting of notches is mounted in the contour of the left hand pane edge.

The surface waves generated by the transmitter 1" first propagate along the vertical pane edge and then travel on the upper edge of the pane, corresponding to the area 5' being monitored. On reaching the second mode converter 3, 34", the surface wave is converted into a volume wave which is propagated through the glass body of the window pane 51 to the opposite vertical pane edge. A part of the energy of the volume wave leads to the production of a signal in the receiver 2. Another part however is detected by the mode converter 34' and converted back into a surface wave which interferes with the surface wave produced primarily by the transmitter 1". This leads to an increase in the energy effectively available and which can be fed into the area 5' being monitored.

This means that in the event of energy being dissipated from the area 5' being monitored, for example, by placing a hand thereon, the energy entering the mode converter 34' would also be reduced as a result of damping. Thus the effective transmission energy is also reduced which leads to an adequate reduction in the vibration energy entering the receiver. The illustrated vibration feedback through the mode converter 3, 34" thus leads to an amplification effect.

Figure 11C:
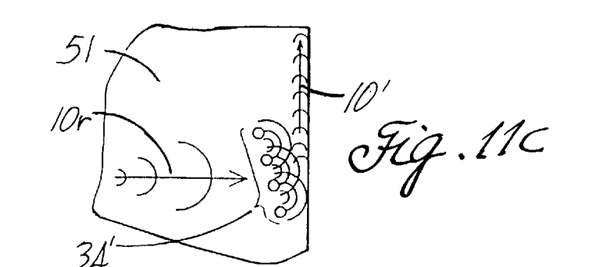
FIG. 11c shows a partial view of the window pane according to FIG. 11a, but with a row of holes of the mode converter set inclined relative to the pane edge.
Figure 12:
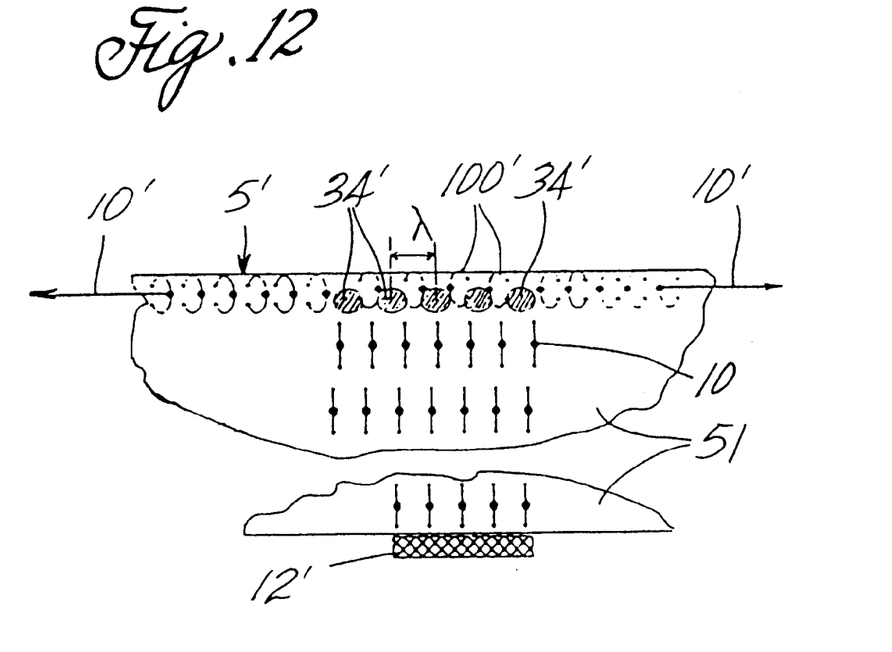
FIG. 12 is a partial view of a glass pane with a periodic hole structure used as a mode converter in the glass body near the pane edge.
Figure 13:
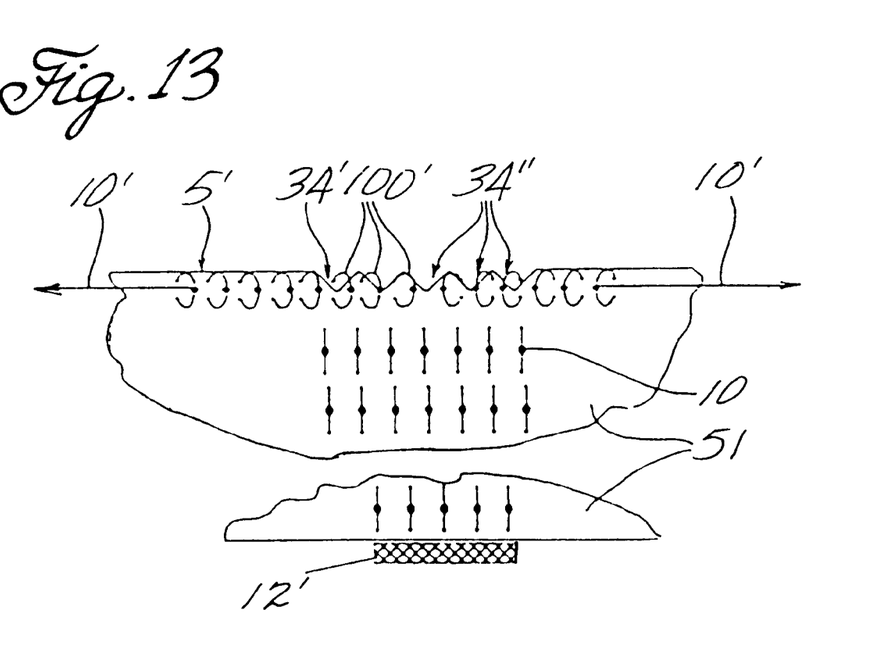
FIG. 13 shows a partial view of a glass pane with a periodic notch structure used as a mode converter in the pane edge of the glass body.

Also advantageous in this connection is an angular position of the mode converter 34' relative to the associated pane edge in order to achieve a directional action of the mode converter 34', as shown in the section according to FIG. 11c. The acoustic energy can thereby collect in the preferred propagation direction which is shown by the arrow 10' of the propagation direction of the surface waves. The surface waves propagating in the opposite direction have a substantially lower energy.

Figure 19:
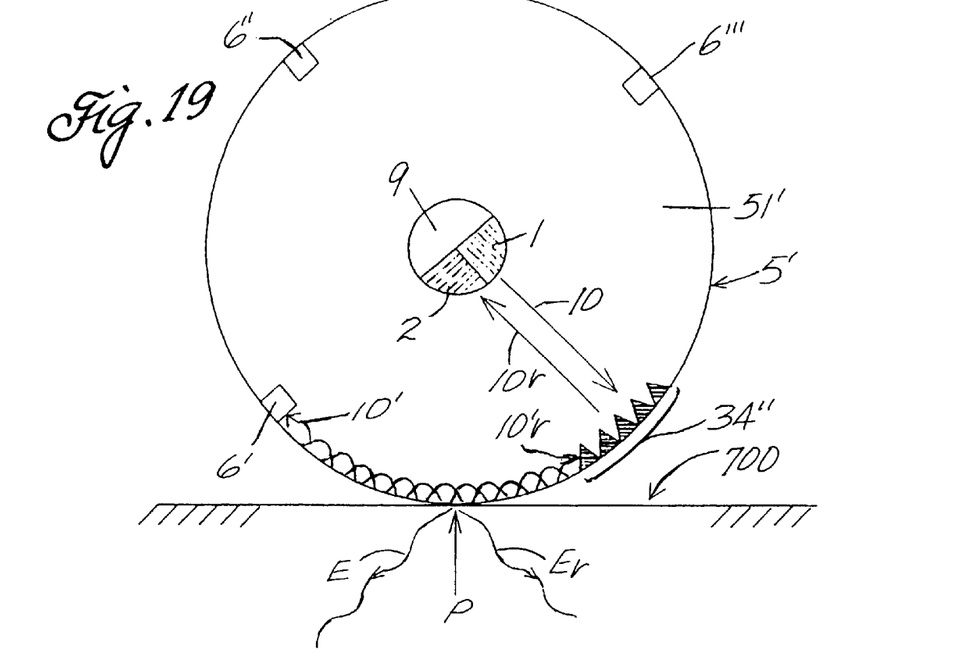
FIG. 19 is a diagrammatic illustration of a device for detecting the rotary angle with notches or gaps as reflectors.

FIG. 19 shows a diagrammatic illustration of a device with a pane-like wave-conducting body 51' which is fixed on a rotatable shaft 9. The body 51' is in friction connection at one contacting point P with a flat contact face 700 and can be moved relative to this face 700 when the shaft 9 is rotated. Inside the hollow shaft 9 a transmitter 1 and receiver 2 are mounted so that they can feed volume waves 10 into the body 5 and receive volume waves 10r respectively. Evenly distributed around the circumference of the pane-like body 5 are a mode converter 34" and three notches or slit-like reflectors 6',6",6"' wherein the mode converter 34" lies directly opposite the transmitter/receiver unit 1, 2. Detection of the rotary direction is also possible even with an irregular distribution of the reflectors.

Figure 14:
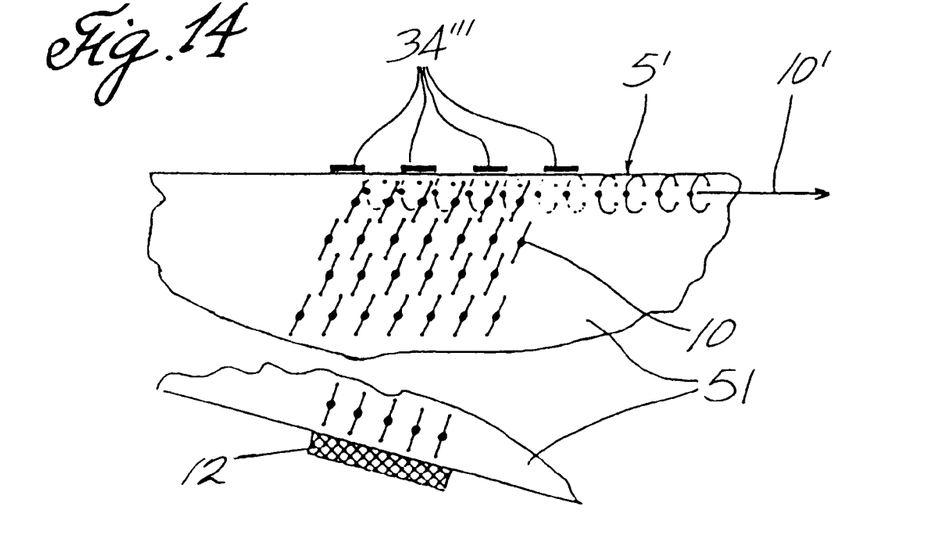
FIG. 14 is a partial view of a glass pane with a periodic surface structure used as a mode converter, formed by elements stuck onto the pane edge.
Figure 15:
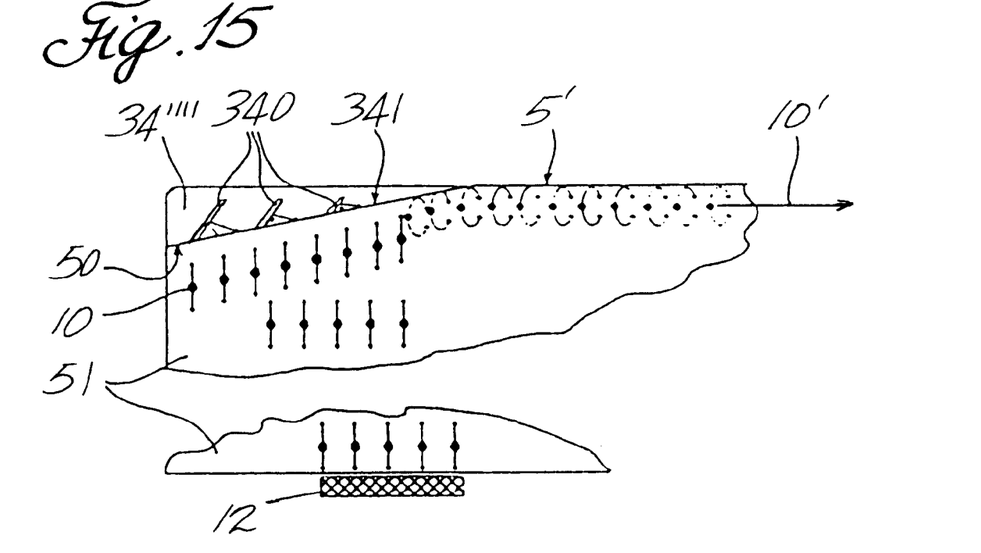
FIG. 15 is a partial view of a glass pane with a periodic structure of reflection elements in a wedge used as a mode converter set on the pane edge.

The device described is suitable for detecting the rotary angle relative to the surface 700 contacted at contact point P wherein it is assumed that the propagation and receiving of surface waves preferably takes place starting from the mode converter in one direction, for example by using a mode converter design according to FIG. 11c, FIG. 14 or FIG. 15.

The volume wave 10 emitting from the transmitter 1"' is on reaching the mode converter 34" converted into a surface wave 10' and propagates in the direction of the reflector 6'. A part of the vibration energy is on reaching the contact point P dissipated as lost energy in the form of mechanical energy and heat. The remaining energy of the surface wave spreads up to the first reflector 6' where one part is reflected and another part is passed onto the next reflector 6". The reflected part of the surface wave 10' again discharges a part of its vibration energy on reaching the contact point P as lost energy Er. Only the remaining small amount of the reflected surface wave 10' can be converted by the mode converter 34" back into a volume wave 10r and sensed by the receiver 2. Owing to the very small receiving signal, the evaluator logic device concludes a contact in the area between the mode converter 34" and the first reflector 6' of the rotatable body 5 with the surface 700.

The marked area part of the circumferential face 5' between the reflector 6' and mode converter 34" can be differentiated from the area parts formed with the remaining reflectors 6"6,6"' through the different running time of the surface wave. It is thereby possible to take into account the energy losses which occur when overcoming the partially transparent reflectors 6',6",6"' and to allocate to each area a correspondingly adapted ideal value for signal evaluation.

If the accuracy of the rotary angle recognition should only require 360 degs., that is, one rotation and thus is to be equated with speed recognition, it is possible to dispense completely with reflectors (not shown). When the mode converter 34" rotates past contact point P there would result a sudden change of signal which can serve as a counting impulse for counting the number of rotations.

Figure 20:
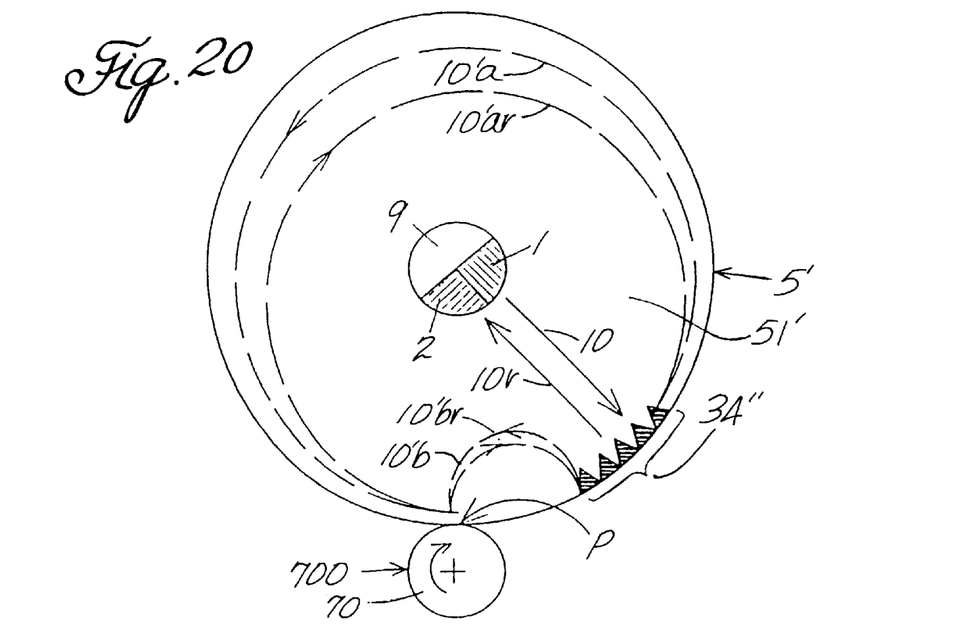
FIG. 20 is a diagrammatic illustration of a device for detecting the rotary angle without reflectors by means of evaluating the running time.

The principle of the device of FIG. 20 uses a similarly constructed wave-conducting rotatable pane 5 which does not however have reflectors. It is in connection with a likewise rotatably mounted roller 70 through its surface 700.

The contact between the two parts 51', 70 is produced so that a reflection spot P is thereby formed for the surface waves. As a result of the relationship of the running times of the surface wave 10'a emerging from the mode converter 34" on one side and its reflected surface wave 10'ar and the surface wave 10'b emerging from the mode converter 34" on the other side and its reflected surface wave 10'br it is possible to deduce the angular position of the part 51' relative to the reflection spot P. In order to clarify the angular-related paths, the propagation of the surface waves 10'a, 10'ar, 10'b, 10'br were not shown on the surface, that is in the area of the wave continuation, but was symbolized by dotted lines inside the body 51'.

The mode converter 34" illustrated is one emitting equally in both directions. However it can also be designed (not shown, but see FIGS. 11c, 14, 15) so that it has an asymmetric behavior with a preferred propagation direction for surface waves. In this case, a change of rotational direction can also be reliably detected.

FIGS. 12 to 15 show various design possibilities for mode converters whose transmitter/receiver characteristics are partly direction-independent and partly direction-dependent. Since FIGS. 12 and 13 only show enlarged cut-out sections of FIGS. 9 and 10 which have already been described repetitive explanations are omitted here. However it should be pointed out that the embodiments already considered have direction-independent transmitting/receiving characteristics as they produce surface waves in both directions along the edge of the displaceable object.

A mode converter 34'" consisting of several individual elements fitted on the edge of the pane is shown in FIG. 14. The spacing of the individual elements again corresponds to the wave length λ of the surface wave being produced. Compared to the variation of FIGS. 12 and 13 this embodiment has the advantage that no removal of the material of the pane edge need be undertaken which can be a problem in the case of pretensioned window panes for motor vehicles. The transmitting plane of the opposing transmitter/receiver unit is set inclined relative to the plane of the mode converter 34'" and the pane edge 5' being monitored and supporting same. Thus the emitted volume waves strike the mode converter 34'" at a corresponding angle which leads to a preferred propagation direction 10' of the surface waves generated there.

Also the receiving of the surface wave and its conversion back into a volume wave is preferred from this direction. Therefore a mode converter 34'" of this kind should, as with the embodiment of FIG. 6, be mounted at one end of the area 5' being monitored whilst the other end of the area 5' being monitored is flanked by a reflector 6'.

A mode converter with similarly excellent transmitter/receiver characteristics is shown in FIG. 15. It has a wedge-type shape and is connected fixedly to the pane edge 5' through a coupling surface 50. Angular slits 340 are worked into the associated coupling face 341 of the mode converter 34"" with the spacing between the slits corresponding approximately to the wave length λ of the surface wave. The volume waves are first broken at the boundary face (coupling faces 50, 341) between glass body 51' and mode converter 34"" in the direction of the slits 340 in order to be reflected there and finally fed again into the glass body 51'. The interference of the reflected waves now leads to the formation of the desired surface wave.

Figure 16:
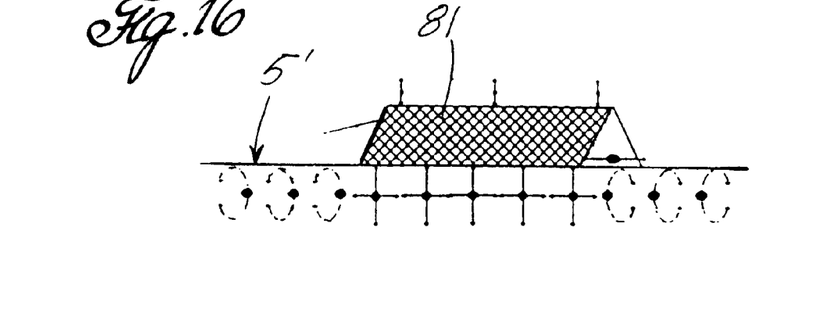
FIG. 16 is a plan view illustration of a thickness-shear vibrator for producing surface waves.

If surface waves are to be generated directly from the transmitter, there are various designs of electrical-mechanical converters available. For example as shown in the principle illustration of FIG. 16, a piezo electric vibrator 81 which is fixedly connected to the glass edge 5' can be excited with corresponding polarization into a coupled thickness-shear movement so that an elliptical deflection of the particles takes place at the boundary face to the pane edge 5'. Surface waves are thereby produced which propagate equally well in both directions.

Figure 17:
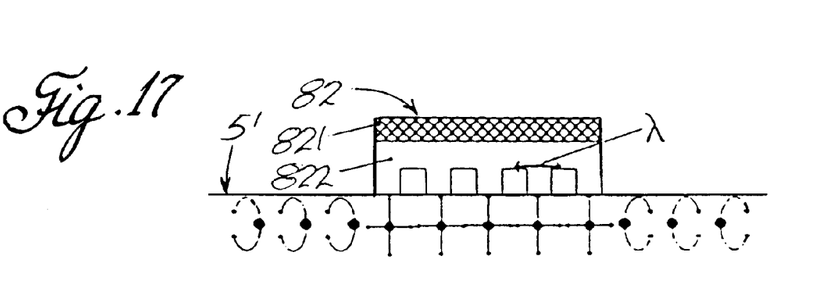
FIG. 17 is a plan view of a comb-like thickness vibrator for producing surface waves.

A further possibility of producing directed surface waves (see FIG. 17) lies in the combination of a thickness vibrator 821 and a comb-like coupling element 822 into a comb converter 82 wherein the toothed spacing of the coupling element 822 is to correspond to the wave length $\lambda$ of the surface wave. The cutting edges of the teeth stand in fixed connection with the pane edge 5' and are sources of elementary waves which interfere in equal phases. Also here the propagation characteristics of the surface waves is direction-independent.

Figure 18A:
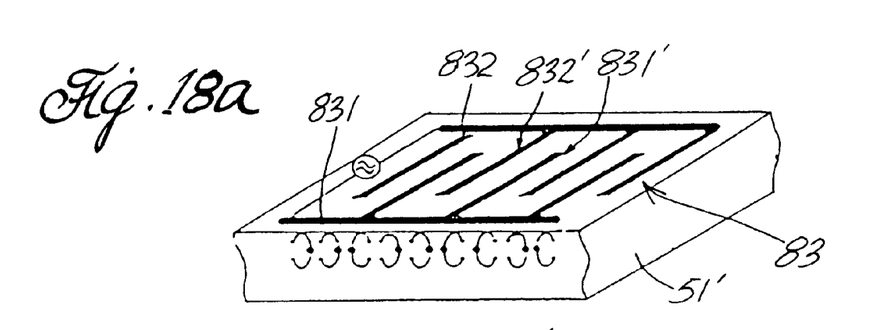
FIG. 18a is a perspective view of an interdigital converter for producing surface waves and coupling into the pane edge.
Figure 18B:
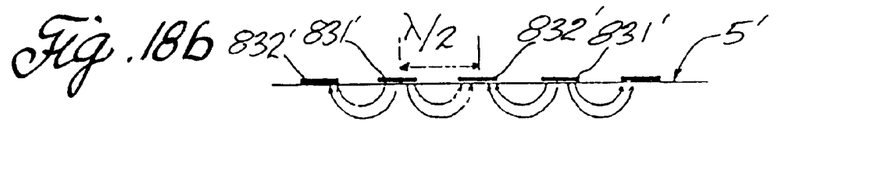

FIG. 18 shows the principle illustration of an interdigital converter 83 stuck onto a fixed body 51' and whose electrodes 831, 832 are fitted on a piezo ceramic or are connected by an additional coupling electrode to the piezo ceramic. The alternately mounted electrode fingers 831', 832' again have a spacing of $\lambda/2$. The surface wave arises through interference of two progressive waves of opposite propagation direction.

What is claimed is:

1. A device for controlling a displaceable object, comprising an area to be monitored having two ends, operated by a motorized drive unit comprising:
   a transmitter comprising an electrical-mechanical converter adapted to trigger vibrations in the material of the displaceable object, wherein said vibrations form the basis of a surface wave which is propagated along a surface of the area to be monitored;
   a receiver comprising a mechanical-electrical converter adapted to receive acoustic vibrations and convert them into electrical signals;
   an electronic control and evaluator unit adapted to control the transmitter, the receiver, and the motorized drive unit on the basis of the electrical signals from the receiver; and
   at least one mode converter operatively connected to the area to be monitored, wherein the at least one mode converter is capable of performing the functions of
      a) converting a first volume wave formed by the vibrations generated by the transmitter and entering the area to be monitored into the surface wave and
      b) converting the surface wave from the surface of the area to be monitored and entering the receiver into a second volume wave.

2. A device according to claim 1 wherein the mode converter comprises a plurality of periodically positioned elements which are positioned along a propagation direction of the surface wave and have a division t between adjacent periodically positioned elements which corresponds approximately to the wave length $\lambda$ of the surface wave.

3. The device according to claim 2, wherein the plurality of periodically positioned elements comprise a row of holes integrated into the displaceable object.

4. The device according to claim 2, wherein at one end of the area to be monitored is mounted the transmitter adapted to directly produce the surface wave and at the other end of the area to be monitored is the mode converter adapted to convert the surface wave into the second volume wave wherein the receiver is mounted in a main propagation direction of the second volume wave.

5. The device according to claim 2, wherein the plurality of periodically positioned elements comprise a plurality of wedge-shaped recesses integrated into the geometry of an edge of the displaceable object.

6. The device according to claim 5, wherein the plurality of wedge-shaped recesses are formed as teeth.

7. The device according to claim 5, wherein the plurality of wedge-shaped recesses are formed as notches.

8. The device according to claim 5, wherein the plurality of wedge-shaped recesses are symmetrically shaped.

9. The device according to claim 5, wherein the plurality of wedge-shaped recesses are asymmetrically shaped.

10. The device according to claim 2, wherein the periodically positioned elements comprise additional separate parts which are mounted on an edge of the displaceable object.

11. The device according to claim 10, wherein the mode converter is formed by individual elements which are connected, at a spacing which corresponds approximately to the wavelength $\lambda$ of the surface waves, fixedly to the edge of the displaceable object, and wherein a transmitting direction of a volume wave transmitted by the transmitter in the material of the displaceable object runs at an angle to the edge of the displaceable object.

12. The device according to claim 10, wherein the mode converter is formed by a wedge set on the edge of the displaceable object and comprising slits at a spacing which corresponds approximately to the wavelength $\lambda$ of the surface waves and which are inclined relative to a transmitting direction of a volume wave transmitted by the transmitter in the material of the displaceable object.

13. The device according to claim 1, wherein the mode converter is mounted at one end of the area to be monitored and further comprising a reflector mounted at the other end of the area to be monitored, wherein the mode converter is active in both propagation directions of the surface wave, and wherein the transmitter and the receiver are provided as a one-piece transmitter/receiver unit to produce and receive said first and second volume waves.

14. The device according to claim 1, wherein the mode converter is mounted at one end of the area to be monitored and the receiver is adapted to directly receive the surface wave and is mounted at the other end of the area to be monitored, and wherein a simple thickness vibrator is provided as the transmitter for producing the first volume wave.

15. The device according to claim 1, wherein the area to be monitored is defined at each end by a reflector mounted on the displaceable object and that between the reflectors is provided the mode converter for generating two surface waves, each directed to a different one of the reflectors and which is associated with a one-piece transmitting/receiving unit comprising the transmitter and the receiver for respectively producing and receiving said first and second volume waves.

16. The device according to claim 1, wherein one end of the area to be monitored is provided with the transmitter which is adapted to directly produce the surface wave and a first mode converter adapted to convert volume waves into surface waves, and the other end of the area to be monitored is provided with a second mode converter adapted to convert the surface wave into the second volume wave, wherein the second volume wave partly strikes the first mode converter and partly strikes the receiver.

17. The device according to claim 1, wherein a comb-like thickness vibrator is provided as the transmitter and wherein the comb has free ends that are connected to an edge of the displaceable object.

18. The device according to claim 1, wherein an interdigital converter which is provided as at least one of the transmitter and the receiver.

19. The device according to claim 1, wherein the displaceable object is a window pane of a motor vehicle.

20. The device according to claim 1, wherein the displaceable object is a rotatably-mounted part having a rotary axis and an outer sleeve face, and wherein the electronic control and evaluator unit is adapted to detect at least one of the position and displacement speed of the rotatably mounted part.

21. The device according to claim 20, wherein the outer sleeve face of the rotatably mounted part comprises a plurality of reflectors which divide the sleeve face into a plurality of measuring sections.

22. The device according to claim 20, wherein the outer sleeve face of the rotatably mounted part is in friction connection with a contact face at a contact point, wherein the outer sleeve face comprises an active area continuously in contact with the contact face as the rotatably mounted part rotates, wherein the mode converter is mounted in the active area of the sleeve face, and wherein the transmitter and the receiver, adapted to receive volume waves, are connected to the rotary axis of the rotatably mounted part.

23. The device according to claim 22, wherein the contact face is movable.

24. The device according to claim 22, wherein the contact face is fixed.

25. The device according to claim 22, wherein a reflection spot is formed at the contact face.

26. The device according to claim 22, wherein a spot is formed at the contact face at which energy of the surface wave along the area to be monitored is dissipated.

27. The device according to claim 1, wherein the displaceable object is a sliding roof in a motor vehicle.

28. The device according to claim 1, wherein the at least one mode converter is mounted on the displaceable object directly in the area to be monitored.

29. The device according to claim 1, wherein the at least one mode converter is mounted on the displaceable object adjacent the area to be monitored.

30. A process for controlling a displaceable object of a motor vehicle that is operated by a motorized drive unit comprising:
transmitting vibration energy into the displaceable object with a transmitter in the form of an electrical-mechanical converter;
propagating a portion of the vibration energy as an acoustic surface wave along an area to be monitored on the displaceable object;
sensing incoming vibration energy from the area to be monitored using a receiver in the form of a mechanical-electrical converter;
converting the acoustic surface wave from the transmitter in its route to the receiver at least once through a mode converter;
evaluating a magnitude of the incoming vibration energy at the receiver with an electrical control and evaluator device; and
controlling the transmitter and the drive unit with the electrical control and evaluator unit in response to the magnitude of the incoming vibration energy at the receiver.

31. The process according to claim 30 further comprising:
producing a first volume wave on an edge of the displaceable object not belonging to the area to be monitored;
striking the first volume wave on the mode converter which is positioned in an active range of the area to be monitored;
converting a part of the energy of the first volume wave into a surface wave which is propagated on a surface of the area to be monitored
reflecting the surface wave at an end of the area to be monitored so that a reflected surface wave is returned toward the mode converter;
converting the reflected surface wave back into a second volume wave;
measuring the energy of the second volume wave with the receiver; and
evaluating the measured signal with the electrical control and evaluator unit.

32. The process according to claim 30, wherein the displaceable object is a window pane.

33. The process according to claim 32, wherein the area to be monitored is an edge of the window pane.

34. The process according to claim 30, wherein the displaceable object is a sliding roof.

35. A device for controlling a displaceable object, comprising an area to be monitored having two ends, operated by a motorized drive unit comprising:
a transmitter comprising an electrical-mechanical converter adapted to trigger vibrations in the material of the displaceable object, wherein said vibrations form the basis of a surface wave which is propagated along a surface of the area to be monitored;
a receiver comprising a mechanical-electrical converter adapted to receive acoustic vibrations and convert them into electrical signals;
an electronic control and evaluator unit adapted to control the transmitter, the receiver, and the motorized drive unit on the basis of the electrical signals from the receiver; and
at least one mode converter operatively connected to the area to be monitored, wherein the at least one mode converter is capable of performing the function of converting a first volume wave formed by the vibrations generated by the transmitter and entering the area to be monitored into the surface wave.

36. A device according to claim 35 wherein the mode converter comprises a plurality of periodically positioned elements which are positioned along a propagation direction of the surface wave and have a division t between adjacent periodically positioned elements which corresponds approximately to the wave length $\lambda$ of the surface wave.

37. The device according to claim 36, wherein the plurality of periodically positioned elements comprise a row of holes integrated into the displaceable object.

38. The device according to claim 36, wherein the plurality of periodically positioned elements comprise a plurality of wedge-shaped recesses integrated into the geometry of an edge of the displaceable object.

39. The device according to claim 38, wherein the plurality of wedge-shaped recesses are formed as teeth.

40. The device according to claim 38, wherein the plurality of wedge-shaped recesses are formed as notches.

41. The device according to claim 38, wherein the plurality of wedge-shaped recesses are symmetrically shaped.

42. The device according to claim 38, wherein the plurality of wedge-shaped recesses are asymmetrically shaped.

43. The device according to claim 36, wherein the periodically positioned elements comprise additional separate parts which are mounted on an edge of the displaceable object.

44. The device according to claim 43, wherein the mode converter is formed by individual elements which are connected, at a spacing which corresponds approximately to the wavelength λ of the surface waves, fixedly to the edge of the displaceable object, and wherein a transmitting direction of a volume wave transmitted by the transmitter in the material of the displaceable object runs at an angle to the edge of the displaceable object.

45. The device according to claim 43, wherein the mode converter is formed by a wedge set on the edge of the displaceable object and comprising slits at a spacing which corresponds approximately to the wavelength λ of the surface waves and which are inclined relative to a transmitting direction of a volume wave transmitted by the transmitter in the material of the displaceable object.

46. The device according to claim 35, wherein the mode converter is mounted at one end of the area to be monitored and the receiver is adapted to directly receive the surface wave and is mounted at the other end of the area to be monitored, and wherein a simple thickness vibrator is provided as the transmitter for producing the first volume wave.

47. The device according to claim 35, wherein a comb-like thickness vibrator is provided as the transmitter wherein free ends of the comb are connected to an edge of the displaceable object.

48. The device according to claim 35, wherein an interdigital converter which is provided as at least one of the transmitter and the receiver.

49. The device according to claim 35, wherein the displaceable object is a window pane of a motor vehicle.

50. The device according to claim 35, wherein the displaceable object is a rotatably-mounted part having a rotary axis and an outer sleeve face, and wherein the electronic control and evaluator unit is adapted to detect at least one of the position and displacement speed of the rotatably mounted part.

51. The device according to claim 50, wherein the outer sleeve face of the rotatably mounted part comprises a plurality of reflectors which divide the sleeve face into a plurality of measuring sections.

52. The device according to claim 50, wherein the outer sleeve face of the rotatably mounted part is in friction connection with a contact face at a contact point, wherein the outer sleeve face comprises an active area continuously in contact with the contact face as the rotatably mounted part rotates, wherein the mode converter is mounted in the active area of the sleeve face, and wherein the transmitter and the receiver, adapted to receive volume waves, are connected to the rotary axis of the rotatably mounted part.

53. The device according to claim 52, wherein the contact face is movable.

54. The device according to claim 52, wherein the contact face is fixed.

55. The device according to claim 52, wherein a reflection spot is formed at the contact face.

56. The device according to claim 52, wherein a spot is formed at the contact face at which energy of the surface wave along the area to be monitored is dissipated.

57. The device according to claim 35, wherein the displaceable object is a sliding roof in a motor vehicle.

58. The device according to claim 35, wherein the at least one mode converter is mounted on the displaceable object directly in the area to be monitored.

59. The device according to claim 35, wherein the at least one mode converter is mounted on the displaceable object adjacent the area to be monitored.

60. A device for controlling a displaceable object, comprising an area to be monitored having two ends, operated by a motorized drive unit comprising:

a transmitter comprising an electrical-mechanical converter adapted to trigger vibrations in the material of the displaceable object, wherein said vibrations form the basis of a surface wave which is propagated along a surface of the area to be monitored;

a receiver comprising a mechanical-electrical converter adapted to receive acoustic vibrations and convert them into electrical signals;

an electronic control and evaluator unit adapted to control the transmitter, the receiver, and the motorized drive unit on the basis of the electrical signals from the receiver; and at least one mode converter operatively connected to the area to be monitored, wherein the at least one mode converter is capable of performing the function of converting the surface wave from the surface of the area to be monitored and entering the receiver into a second volume wave.

61. A device according to claim 60 wherein the mode converter comprises a plurality of periodically positioned elements which are positioned along a propagation direction of the surface wave and have a division t between adjacent periodically positioned elements which corresponds approximately to the wave length λ of the surface wave.

62. The device according to claim 61, wherein the plurality of periodically positioned elements comprise a row of holes integrated into the displaceable object.

63. The device according to claim 61, wherein the periodically positioned elements comprise additional separate parts which are mounted on an edge of the displaceable object.

64. The device according to claim 63, wherein the mode converter is formed by individual elements which are connected, at a spacing which corresponds approximately to the wavelength λ of the surface waves, fixedly to the edge of the displaceable object, and wherein a transmitting direction of a volume wave transmitted by the transmitter in the material of the displaceable object runs at an angle to the edge of the displaceable object.

65. The device according to claim 63, wherein the mode converter is formed by a wedge set on the edge of the displaceable object and comprising slits at a spacing which corresponds approximately to the wavelength λ of the surface waves and which are inclined relative to a transmitting direction of a volume wave transmitted by the transmitter in the material of the displaceable object.

66. The device according to claim 61, wherein the plurality of periodically positioned elements comprise a plurality of wedge-shaped recesses integrated into the geometry of an edge of the displaceable object.

67. The device according to claim 66, wherein the plurality of wedge-shaped recesses are formed as teeth.

68. The device according to claim 66, wherein the plurality of wedge-shaped recesses are formed as notches.

69. The device according to claim 66, wherein the plurality of wedge-shaped recesses are symmetrically shaped.

70. The device according to claim 66, wherein the plurality of wedge-shaped recesses are asymmetrically shaped.

71. The device according to claim 60, wherein at one end of the area to be monitored is mounted the transmitter adapted to directly produce the surface wave and at the other end of the area to be monitored is the mode converter adapted to convert the surface wave into the second volume wave wherein the receiver is mounted in a main propagation direction of the second volume wave.

72. The device according to claim 60, wherein one end of the area to be monitored is provided with the transmitter which is adapted to directly produce the surface wave and a first mode converter adapted to convert volume waves into surface waves, and the other end of the area to be monitored is provided with a second mode converter adapted to convert the surface wave into the second volume wave, wherein the second volume wave partly strikes the first mode converter and partly strikes the receiver.

73. The device according to claim 60, wherein a comb-like thickness vibrator is provided as the transmitter wherein free ends of the comb are connected to an edge of the displaceable object.

74. The device according to claim 60, wherein an inter-digital converter which is provided as at least one of the transmitter and the receiver.

75. The device according to claim 60, wherein the displaceable object is a window pane of a motor vehicle.

76. The device according to claim 60, wherein the displaceable object is a rotatably-mounted part having a rotary axis and an outer sleeve face, and wherein the electronic control and evaluator unit is adapted to detect at least one of the position and displacement speed of the rotatably mounted part.

77. The device according to claim 76, wherein the outer sleeve face of the rotatably mounted part is in friction connection with a contact face at a contact point, wherein the outer sleeve face comprises an active area continuously in contact with the contact face as the rotatably mounted part rotates, wherein the mode converter is mounted in the active area of the sleeve face, and wherein the transmitter and the receiver, adapted to receive volume waves, are connected to the rotary axis of the rotatably mounted part.

78. The device according to claim 77, wherein the contact face is movable.

79. The device according to claim 77, wherein the contact face is fixed.

80. The device according to claim 77, wherein a reflection spot is formed at the contact face.

81. The device according to claim 77, wherein a spot is formed at the contact face at which energy of the surface wave along the area to be monitored is dissipated.

82. The device according to claim 76, wherein the outer sleeve face of the rotatably mounted part comprises a plurality of reflectors which divide the sleeve face into a plurality of measuring sections.

83. The device according to claim 60, wherein the displaceable object is a sliding roof in a motor vehicle.

84. The device according to claim 60, wherein the at least one mode converter is mounted on the displaceable object directly in the area to be monitored.

85. The device according to claim 60, wherein the at least one mode converter is mounted on the displaceable object adjacent the area to be monitored.

* * * * *